(12) United States Patent
Navon et al.

(10) Patent No.: US 8,300,058 B2
(45) Date of Patent: Oct. 30, 2012

(54) ELUT: ENHANCED LOOK-UP TABLE SIGNAL PROCESSING

(76) Inventors: Mois P. Navon, Efrat (IL); Yossi Kreinin, Jerusalem (IL); Emmanuel Sixou, Jerusalem (IL); Roman Sajman, Jerusalem (IL)

( * ) Notice: Subject to any disclaimer, the term of this patent is extended or adjusted under 35 U.S.C. 154(b) by 1220 days.

(21) Appl. No.: 12/045,033

(22) Filed: Mar. 10, 2008

(65) Prior Publication Data

US 2009/0228737 A1    Sep. 10, 2009

(51) Int. Cl.
 *G09G 5/36* (2006.01)
 *G06F 13/14* (2006.01)
(52) U.S. Cl. ........................... 345/559; 345/519
(58) Field of Classification Search .............. 345/519, 345/559, 530
 See application file for complete search history.

(56) References Cited

U.S. PATENT DOCUMENTS

| 5,083,267 | A | 1/1992 | Rau et al. |
| 6,446,198 | B1 | 9/2002 | Sazegari |
| 2002/0053015 | A1* | 5/2002 | Tan et al. ............ 712/42 |

OTHER PUBLICATIONS

European Patent Office, Communication pursuant to Article 94(3) EPC, Patent Application No. 08 152 533.9-2211, Mar. 12, 2012.
European Patent Office, extended European search report, Patent Application No. 08 152 533.9-2211, Jul. 21, 2008.
vol. 31 No. 10 Mar. 1989 IBM Technical Disclosure Bulletin, "Pipelined Processor Without Wait State", pp. 138-140.
Shin Y-C et al.: "Special Purpose Register Array for Real-Time Image Processing" Fourth Annual IEEE International ASIC Conference and Exhibit, Sep. 23, 1991, Sep. 27, 1991, pp. P18-1.1-P18-1.4.

* cited by examiner

*Primary Examiner* — Jacinta M Crawford (57) ABSTRACT

An electronic device including an array of addressable registers storing data. An input register connected to the array stores an input command parameter (e.g an opcode of a command) and its associated operands in one or more input registers connected to the addressable register array. A single instance of a command accesses the at least one register of the array. Based on the input command parameter, the command for all of the address operands: reads a datum of the data previously stored in at least one register, updates the datum thereby producing an updated datum, and writes the updated datum into at least one register. The command has multiple address operands referencing the one or more registers and supports two or more of the address operands being identical. The device includes logic circuitry which provides a logical output signal to the processing circuitry indicating which, if any, of the address operands are identical. The processing circuitry based on the logical output, processes first any identical address operands prior to writing the updated datum into the at least one register so that a new instance of the command begins processing by the processing circuitry on a consecutive clock pulse and the command throughput is one command per clock pulse.

20 Claims, 6 Drawing Sheets

ELUT: ENHANCED LOOK-UP TABLE SIGNAL PROCESSING

CROSS REFERENCE TO RELATED APPLICATIONS

N/A

FIELD AND BACKGROUND OF THE INVENTION

The present invention relates to signal processors and, more particularly, to a device which includes an enhanced look-up table for use in digital signal processing. Specifically, the device includes features appropriate for efficient image processing.

Digital signal processing (DSP) includes analysis and processing of signals in a digital representation. DSP includes audio and speech signal processing, sonar and radar signal processing, sensor array processing, spectral estimation, statistical signal processing, image processing, signal processing for communications, biomedical signal processing, seismic data processing, etc.

Since the goal of DSP is usually to measure or filter continuous real-world analog signals, the first step is usually to convert the signal from an analog to a digital form, by using an analog to digital converter. If the required output signal is another analog output signal, then a digital to analog converter is required at the output.

Algorithms required for DSP are sometimes performed using specialized microprocessors called digital signal processors. Digital signal processors process signals in real time and are generally designed as application-specific integrated circuits (ASICs). When flexibility and rapid development are more important than unit costs at high volume, DSP algorithms may also be implemented using field-programmable gate arrays (FPGAs).

(from http://en.wikipedia.org/wiki/Digital_signal_processing)

In computer science, a lookup table in digital processing is an array of registers or memory buffer which allows specific access, i.e. read and write commands based on previously known addresses of the registers and/or memory elements. A lookup table is for example, an associative array used to replace a runtime computation with a simpler lookup operation. Through use of a lookup table, rather than performing the computation each time an entry is accessed, a speed gain can be significant, since retrieving a value from memory is often faster than undergoing a time consuming computation.

A classic example is a trigonometry calculation i.e. calculating the sine of an angle. To avoid unnecessary calculations, a number of sine values are pre-calculated, for example for each whole number of degrees. Later, when the program requires the sine of an angle, the lookup table is used to retrieve the sine of a nearby angle from a memory address instead of calculating it using the mathematical formula.

Before the advent of computers, similar tables were used by people to speed up hand calculations. Particularly prevalent were tables of values for trigonometry, logarithms, and statistical density functions.

In image processing, lookup tables (LUT) are often used to provide an output value for a range of index values. One common LUT is a colormap or palette used to determine colors and intensity values with which a particular image is displayed. (from http://en.wikipedia.org/wiki/Look-up_table)

In statistics, a histogram is a data structure or table in which frequency of occurrence of data is tabulated. The possible data values are divided into several categories or bins and the frequency of occurrence is tabulated for each bin. A histogram is often represented graphically as a bar graph. In image processing, image data is typically tabulated in a histogram based on frequency of occurrence in bins of gray scale or color information.

The symbol "x" is used to denote hexadecimal notation as in "xFF".

The terms "location", "index" and "address" are used herein interchangeably.

SUMMARY OF THE INVENTION

According to the present invention there is provided an electronic device implemented on a semiconductor chip. The electronic device includes an array of addressable registers storing data. An input register connected to the array stores an input command parameter (e.g an opcode of a command) and its associated operands in one or more input registers connected to the addressable register array via logic circuitry. The operands may include either data or address operands typically referencing at least one register of the array. Based on the input command parameter, processing circuitry processes the data stored in the addressable registers. A single instance of a command accesses the at least one register of the array. Based on the input command parameter, the command for all of the address operands: reads a datum of the data previously stored in at least one register, updates the datum thereby producing an updated datum, and writes the updated datum into at least one register. The command has multiple address operands referencing the one or more registers and supports two or more of the address operands being identical. The device preferably includes logic circuitry operatively attached between the input register and the processing circuitry, where the logic circuitry provides a logical output signal to the processing circuitry indicating which, if any, of the address operands are identical. The processing circuitry based on the logical output, processes first any identical address operands prior to writing the updated datum into the at least one register. The electronic device preferably includes a clock which provides multiple clock pulses. While the processing circuitry processes the command during at least three clock pulses, a new instance of the command begins processing by the processing circuitry on a consecutive clock pulse so that there is preferably a command throughput of one command per clock pulse. The command preferably either sets a bin of a histogram or increments a bin of a histogram by an incremental value based on the operands in the input registers. The command optionally compares the datum with the incremental values corresponding to a given bin, calculates the minimal value from amongst the datum and the incremental value(s) and writes as the updated datum the minimal value as said updated datum. The command optionally calculates the maximal value from amongst the datum or the incremental values corresponding to a given bin and writes as the updated datum the maximal value of the datum and the incremental value(s).

When the operand input registers contain address operands, they reference a portion of the addressable storage array. When the portion is contiguous, the size of the contiguous portion is preferably specified by a size value stored in an input control register connected to the array. The command preferably accesses solely the contiguous portion of the array of addressable registers. An input control register is connected to the array (via the logic circuitry) and stores a door-knock value. According to a feature of the present invention, upon initiating the command, the door-knock value is decremented and only when the door-knock value equals a previously defined minimum value (typically zero) is the updated datum written into the at least one register.

According to the present invention there is provided an electronic device implemented on a semiconductor chip. The electronic device includes a first array of addressable registers or locations. Various input registers connected to the array (via the logic circuitry), store an input command parameter, operands and a size value. This second array of input registers is connected to the first array. The input registers of the second array store a plurality of address operands referencing a plurality of locations of the first array. The accessible area of said addressable registers is specified by the size value. The address operands as stored respectively in the second array are calculated by the input command parameter and modulo the size value. Upon processing a command based on said input command parameter, processing circuitry processes data stored in the locations indicated by the address operands. A single instance of the command accesses at least one register of the accessible area such that the processing circuitry for all the address commands: reads a datum of the data previously stored in the at least one register, updates the datum thereby producing an updated datum, and writes the updated datum into the at least one register. The single instance of the command referencing the at least one register of the array supports at least two of the address operands being identical. A clock provides multiple clock pulses. The processing circuitry processes the command during three clock pulses, however a new command can be accepted on every clock cycle so that there is preferably a command throughput of one command per clock pulse.

According to an embodiment of the present invention, there is provided an electronic device implemented on a semiconductor chip. The electronic device includes an array of addressable registers. Input registers connected to the array store an input command parameter specifying a command and its operands. A single instance of the input command accesses the at least one register of the array. The command is executed by processing circuitry which processes the command for all its address operands referencing at least one of the addressable registers of the array. Based on the input command parameter, the command writes a datum into the at least one addressable register. A clock attached to the processing circuitry provides clock pulses. The command throughput in number of commands processed per clock pulse is independent of the number of the address operands. The command throughput is preferably one command per clock pulse. An input control register is preferably connected to the logic circuitry storing a door-knock value and upon receiving the command, the door-knock value is decremented so that only when the door-knock value equals a previously defined minimum value, e.g. 0, is the datum written into the at least one register.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention includes one or more features of an enhanced look-up table integrated into a hardware device. The device may be implemented as part of an image processor designed to provide a command set for efficient image processing.

By way of introduction, the enhanced look-up table device, according to different embodiments of the present invention includes several innovative features. While a prior art look-up table may include registers which allow for register specific read and write accesses, an enhanced look-up table, according to embodiments of the present invention, supports commands to manipulate the data stored in the enhanced look up table in a read-modify-write sequence. An example of a read-modify-write sequence is incrementing bins of a histogram.

Furthermore, whereas a standard LUT might support "vectored" accesses (i.e. one command accesses several consecutive locations), an enhanced look-up table, according to embodiments of the present invention, supports random vectored access i.e., one command can initiate and successfully access several non-consecutive address locations.

Moreover, in an enhanced look up table, according to embodiments of the present invention which maintains a throughput of one command per single clock cycle, random access to redundant or non-unique locations is supported. A single command which accesses different address locations may include a number of redundant locations. For example, a single command performs respective increment operations, (e.g. increment bins of a histogram) to four address locations, e.g. 10, 2, 35, 2 such that address location 2 must be incremented twice by the same command. The command is preferably pre-processed to detect if the same address location appears in the command and if the incremental input values are added together so that address location, e.g 2 of look table is incremented once and not twice thereby improving efficiency.

Another useful feature according to embodiments of the present invention is a programmable "delay" register which allows a "door-knock" value to be set indicating the number of commands attempting to access a given address before the address is actually accessed. The delay feature is analogous to knocking on a door. The door opens only after a previously defined "door-knock count" is reached. The term "door-knock" value is used herein to refer to the value of one of the delay control registers.

The principles and operation of an enhanced look-up table, according to the present invention, may be better understood with reference to the drawings and the accompanying description.

By way of introduction, it should be noted, that although the discussion herein relates to image processing, the present invention may, by non-limiting example, alternatively be configured as well using other information and/or signal processing originating as analog and/or digital signals including statistical signal processing, audio signal processing, speech signal processing and array processing from arrays of sensors.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
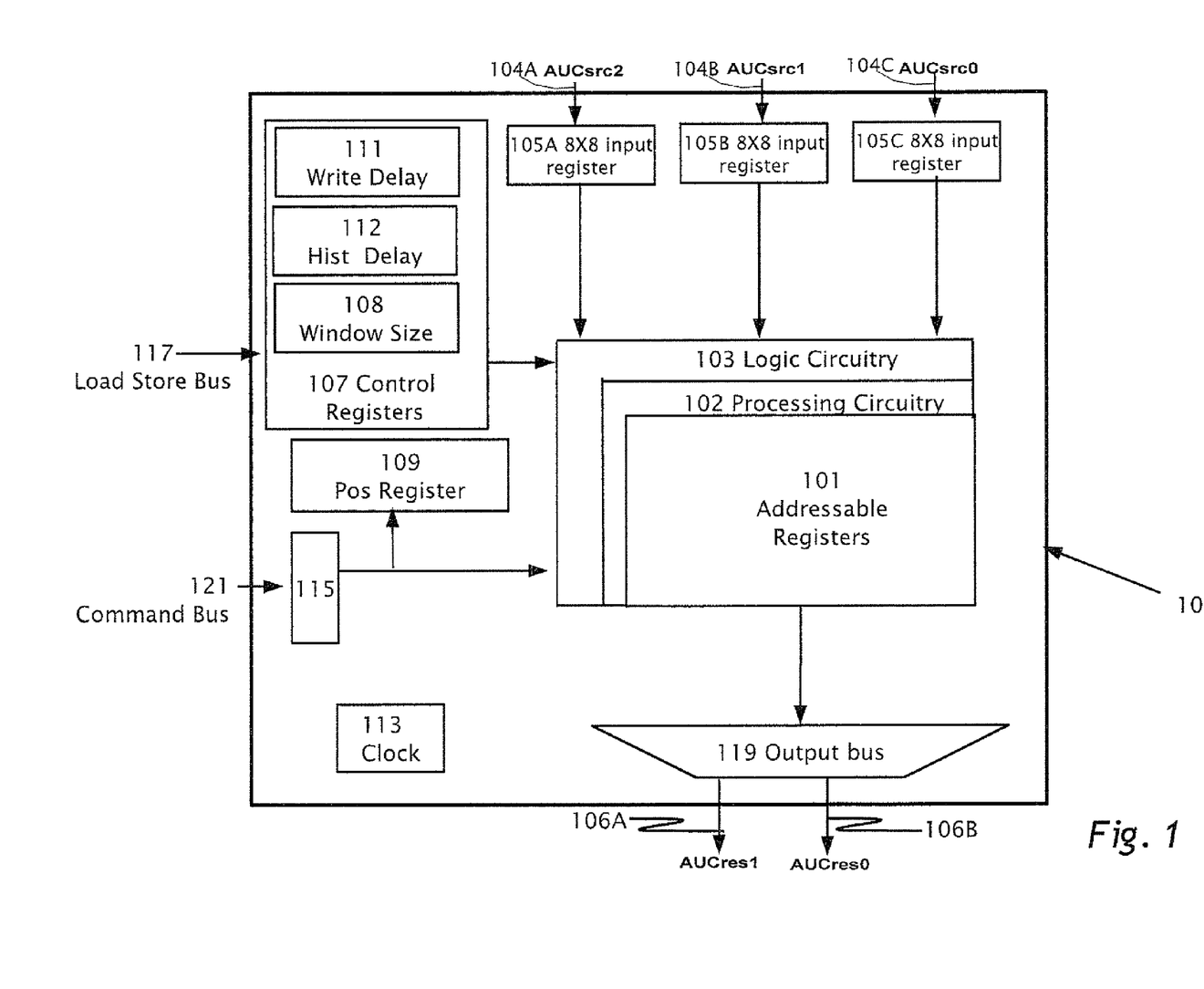
FIG. 1 is a simplified diagram of a device, according to an embodiment of the present invention.

Referring now to the drawings, FIG. 1 illustrates a simplified diagram of a device 10 preferably constructed in an ASIC, FPGA or discrete logic on a PCB, or other known methods in the art of electronics. At the core of device 10 is an array 101 of addressable registers or look-up table (LUT) 101 and associated processing circuitry 102 which processes commands accessing array 101.

An exemplary LUT 101 is a 256 byte register array accessible in odd and even banks. This configuration allows for four odd/even pairs of bytes to be written simultaneously and for eight separate locations to be read simultaneously.

Command input parameters and/or operands are optionally pre-processed by logic circuitry 103. Device 10 further includes three data bus inputs 104A, 104B and 104C of 64 bits, each including for instance 8 input registers of 8 bits each 105A, 105B, 105C (respectively), and similarly two output busses 106A,B of 64 bits (8 registers of 8 bits) from output multiplexer 119.

A memory mapped load/store bus 117 loads configuration or control registers 107. Configuration Registers 107 which contain preferably 16 bit registers are used to control various command operations. Configuration registers 107 as memory mapped locations on load/store bus 117 are preferably accessed via standard memory commands. Configuration registers 107 can preferably be accessed individually or as a 64 bit word. Configuration registers include window size register 108 and delay control registers: write delay register 111 and histogram delay register 112 used for controlling respective "door-knock" delays prior to executing commands.

A command bus 121 (e.g. of 9 bits) indicates the specific command which is latched in a command register 115. Some commands optionally use a register array 109 previously loaded with address locations referencing addresses of array 101. A clock 113 provides clock pulses to parts of device 10 duration operation.

Input registers 105, data feeding output multiplexer 119, position register 109, control registers 107 and command register 115 are preferably latched so that until new values are latched in the respective registers the previously stored values are maintained.

Operation of Device 10

Look-up table 101 is preferably implemented by a multi-port register file able to perform multiple, e.g. 8, reads and writes per cycle of clock 113. Data input to LUT 101 is typically achieved by latching data busses 104 and command bus 121. The outputs from LUT 101 are driven upon any command that changes a specific output bus (i.e., 106A AUCRes0 and/or 106B AUCRes1). Device 10 preferably has a command throughput of 1 clock cycle, such that upon every new clock cycle the incoming command input 115 on the command bus 121 is executed. The device processes commands in a 3 cycle pipeline, such that every command processed has its result available on the output bus 106 after 3 cycles. If there are no commands to execute, the software drives, for instance, NOP commands.

Device 10 preferably handles different command types including: LUT read/write, Histogram, Sliding Window and Miscellaneous. The following table summarizes various command operations, according to different embodiments of the present invention.

TABLE 1

| | Commands |
|---|---|
| Command Type | Command name |
| LUT read/write | lutread_8ub_8b |
| | lutread_4ub_4h_0 |
| | lutread_4ub_4h_1 |
| | lutwrite_1ub_8b |
| | lutrw_8ub_1ub_8b_8b |
| Histogram | histb_4ub_4ub |
| | histh_4ub_4ub_0 |
| | histh_4ub_4ub_1 |
| | histbmin_4ub_4ub |
| | histbmax_4ub_4ub |
| | histbset_4ub_4ub |
| Sliding Window | lutreadinc_8sb_8b |
| | lutreadposld_8ub_8b |
| | lutrwinc_8sb_1ub_8b_8b |
| | lutrwposld_8ub_1ub_8b_8b |
| | lutposld_8ub |
| Misc | reset |
| | nop |

Notation: u = unsigned, s = signed, b = byte (8 bits), h = halfword (16 bits), rw = read/write

Enhanced LUT Commands: Read, Write, ReadWrite

LUT 101 read, write and read/write commands provide for various vectored accesses to device 10. The read and/or write commands are optionally configured for random addressing to non-consecutive addresses.

Upon command lutread_8ub_8b, eight separate bytes are read typically from eight unique locations indicated by eight separate unsigned bytes which are used as indices to the LUT.

Command lutread_8ub_8b pseudo-code is:
AUCres0[07:00]=LUT(AUCsrc0[07:00])
AUCres0[15:08]=LUT(AUCsrc0[15:08])
AUCres0[23:16]=LUT(AUCsrc0[23:16])
AUCres0[31:24]=LUT(AUCsrc0[31:24])
AUCres0[39:32]=LUT(AUCsrc0[39:32])
AUCres0[47:40]=LUT(AUCsrc0[47:40])
AUCres0[55:48]=LUT(AUCsrc0[55:48])
AUCres0[63:56]=LUT(AUCsrc0[63:56])

Upon command lutread_4ub_4h four separate half words, are read from typically four unique locations indicated by four separate unsigned bytes which are used as indices to LUT 101. An opcode extension bit optionally indicates whether the 7 bit index to the 128 half words comes from the 7 least significant bits lsbs (ext=0), or the 7 most significant bits (ext=1).

Pseudo code for command lutread_4ub_4h is:
for ext=0:
AUCres0[15:00]={LUT(AUCsrc0[06:00],b1),LUT(AUCsrc0[06:00],b0)}
AUCres0[31:16]={LUT(AUCsrc0[14:08],b1),LUT(AUCsrc0[14:08],b0)}
AUCres0[47:32]={LUT(AUCsrc0[22:16],b1),LUT(AUCsrc0[22:16],b0)}
AUCres0[63:48]={LUT(AUCsrc0[30:24],b1),LUT(AUCsrc0[30:24],b0)}
for ext=1:
AUCres0[15:00]={LUT(AUCsrc0[07:01],b1),LUT(AUCsrc0[07:01],b0)}
AUCres0[31:16]={LUT(AUCsrc0[15:09],b1),LUT(AUCsrc0[15:09],b0)}

AUCres0[47:32]={LUT(AUCsrc0[23:17],b1),LUT(AUCsrc0[23:17],b0)}

AUCres0[63:48]={LUT(AUCsrc0[31:25],b1),LUT(AUCsrc0[31:25],b0)}

Upon command lutwrite_1ub_8b eight separate bytes, are written to eight consecutive bytes located by one unsigned byte which is used as an index to LUT 101. The index is eight byte aligned, and thus processing circuitry 102 zeros the 3 least significant bits.

Pseudo code for command lutwrite_1ub_8b is:
LUT(AUCsrc1[07:03],000)=AUCsrc2[07:00]
LUT(AUCsrc1[07:03],001)=AUCsrc2[15:08]
LUT(AUCsrc1[07:03],010)=AUCsrc2[23:16]
LUT(AUCsrc1[07:03],011)=AUCsrc2[31:24]
LUT(AUCsrc1[07:03],100)=AUCsrc2[39:32]
LUT(AUCsrc1[07:03],101)=AUCsrc2[47:40]
LUT(AUCsrc1[07:03],110)=AUCsrc2[55:48]
LUT(AUCsrc1[07:03],111)=AUCsrc2[63:56]

Command lutrw_8ub_1ub_8b_8b is a combination of the lutwrite and lutread commands. Eight separate bytes are read from eight unique locations indicated by eight separate unsigned bytes which are used as indices to LUT 101.

Pseudo code for command lutrw_8ub_1ub_8b_8b is:
AUCres0[07:00]=LUT(AUCsrc0[07:00])
AUCres0[15:08]=LUT(AUCsrc0[15:08])
AUCres0[23:16]=LUT(AUCsrc0[23:16])
AUCres0[31:24]=LUT(AUCsrc0[31:24])
AUCres0[39:32]=LUT(AUCsrc0[39:32])
AUCres0[47:40]=LUT(AUCsrc0[47:40])
AUCres0[55:48]=LUT(AUCsrc0[55:48])
AUCres0[63:56]=LUT(AUCsrc0[63:56])
LUT(AUCsrc1[07:03],000)=AUCsrc2[07.00]
LUT(AUCsrc1[07:03],001)=AUCsrc2[15:08]
LUT(AUCsrc1[07:03],010)=AUCsrc2[23:16]
LUT(AUCsrc1[07:03],011)=AUCsrc2[31:24]
LUT(AUCsrc1[07:03],100)=AUCsrc2[39:32]
LUT(AUCsrc1[07:03],101)=AUCsrc2[47:40]
LUT(AUCsrc1[07:03],110)=AUCsrc2[55:48]
LUT(AUCsrc1[07:03],113)=AUCsrc2[63:56]

Eight separate bytes are written to eight typically consecutive bytes located by one unsigned byte which is used as an index to LUT 101. The index is eight byte-aligned, and thus processing circuitry 102 zeros the three least significant bits.

Commands lutwrite_1ub_8b and lutrw_8ub_1ub_8b_8b are optionally preformed in conjunction with "write delay" control register 111 which contains a door-knock value to be decremented upon receiving a write type command. The actual write indicated in the command is executed when the delay register door-knock value is a previously determined minimal value, typically zero. A decrement on the register is not performed following a successful write of the data.

Histogram Commands

Histogram commands provide for various histogram manipulations. Each histogram command provides for multiple, e.g four, bins to be updated simultaneously. According to an embodiment of the present invention, the four bin locations are not necessarily unique, and as such, a histogram command may actually request updating one and the same bin with four different values. To support this eventuality, the logic circuitry 103 compares bin address operands and performs the requested operation accounting for all corresponding address operands even with redundant bins.

Furthermore, histogram commands are performed in conjunction with Control Register 112 "hist delay" which contains a door-knock value to be decremented upon receiving a histogram command. The actual histogram update requested by the command is executed when the value stored in hist delay register 112 is zero. No decrement on register 112 is performed following a successful histogram update. Typically, histogram commands include read and then write cause a decrement of the door-knock value only following the write phase of the command.

Histogram commands typically require three clock cycles to execute. During the first clock cycle current bin value is read (histrd) and during the second clock cycle to the updated bin value is calculated (histdatcalc) and during the third cycle the updated bin value is written back (histwr) into the same address. According to an embodiment of the present invention during operation of device 10, a throughput of one cycle is preferably maintained, i.e. a new command is accepted every cycle. In the event that the software performs an illegal sequence of commands, the illegal commands are ignored (converted internally to reset commands) and the original histogram commands will complete normally.

Exemplary histogram commands are described as follows, according to different embodiments of the present invention:

In command histb_4ub_4ub four separate unsigned bytes, specify four indices to LUT 101 organized as 256 bytes which are to be incremented by four corresponding values indicated by four separate unsigned bytes. In the case that the new value to be written is greater than xFF, the new value is saturated to xFF.

Pseudo-code for command histb_4ub_4ub is:
LUT(AUCsrc0[07:00])=LUT(AUCsrc0[07:00])+AUCsrc2[07:00]
LUT(AUCsrc0[15:08])=LUT(AUCsrc0[15:08])+AUCsrc2[15:08]
LUT(AUCsrc0[23:16])=LUT(AUCsrc0[23:16])+AUCsrc2[23:16]
LUT(AUCsrc0[31:24])=LUT(AUCsrc0[31:24])+AUCsrc2[31:24]

In command histh_4ub_4ub four separate unsigned bytes, specify four indices to LUT 101 organized as 128 half words which are to be incremented by four corresponding values indicated by four separate unsigned bytes. In the case that the new value to be written is greater than xFFFF, the new value is saturated to xFFFF.

The opcode extension bit preferably indicates whether the 7 bit index comes from the 7 least significant bits (ext=0), or the 7 most significant bits. (ext=1).

Pseudo code for command histh_4ub_4ub is:
LUTbin0=LUTbin0+AUCsrc2[07:00]
LUTbin1=LUTbin1+AUCsrc2[15:08]
LUTbin2=LUTbin2+AUCsrc2[23:16]
LUTbin3=LUTbin3+AUCsrc2[31:24]

In the case that more than one index points to the same bin, the bin will be incremented with the sum of all the increment values.

Where, for ext=0
LUTbin0={LUT(AUCsrc0[06:00],b1),LUT(AUCsrc0[06:00],b0)}
LUTbin1={LUT(AUCsrc0[14:08],b1),LUT(AUCsrc0[14:08],b0)}
LUTbin2={LUT(AUCsrc0[22:16],b1),LUT(AUCsrc0[22:16],b0)}
LUTbin3={LUT(AUCsrc0[30:24],b1),LUT(AUCsrc0[30:24],b0)}

Where, for ext=1
LUTbin0={LUT(AUCsrc0[07:01],b1),LUT(AUCsrc0[07:01],b0)}
LUTbin1={LUT(AUCsrc0[15:09],b1),LUT(AUCsrc0[15:09],b0)}

LUTbin2={LUT(AUCsrc0[23:17],b1),LUT(AUCsrc0[23:17],b0)}
LUTbin3={LUT(AUCsrc0[31:25],b1),LUT(AUCsrc0[31:25],b0)}

In command histbmin_4ub_4ub four separate unsigned bytes, specify four indices to LUT 101 organized as 256 bytes to be updated by four corresponding "update" values indicated by four separate unsigned bytes, such that LUT 101 entry receives the minimum value between its current value and the update operand value.

Pseudo-code for command histbmin_4ub_4ub is:
LUT(AUCsrc0[07:00])=min[LUT(AUCsrc0[07:00]),AUCsrc2[07:00]]
LUT(AUCsrc0[15:08])=min[LUT(AUCsrc0[15:08]),AUCsrc2[15:08]]
LUT(AUCsrc0[23:16])=min[LUT(AUCsrc0[23:16]),AUCsrc2[23:16]]
LUT(AUCsrc0[31:24])=min[LUT(AUCsrc0[31:24]),AUCsrc2[31:24]]

In the case that more than one index points to the same bin, the bin is preferably updated with the minimum of all the update values In command histbmax_4ub_4ub four separate unsigned bytes, specify four indices to LUT 101 organized as 256 bytes to be updated by four corresponding "update" values indicated by four separate unsigned bytes, such that LUT 101 entry receives the maximum value between its current value and the update operand.

Pseudo code for command histbmax_4ub_4ub is:
LUT(AUCsrc0[07:00])=max[LUT(AUCsrc0[07:00]),AUCsrc2[07:00]]
LUT(AUCsrc0[15:08])=max[LUT(AUCsrc0[15:08]),AUCsrc2[15:08]]
LUT(AUCsrc0[23:16])=max[LUT(AUCsrc0[23:16]),AUCsrc2[23:16]]
LUT(AUCsrc0[31:24])=max[LUT(AUCsrc0[31:24]),AUCsrc2[31:24]]

In the case that more than one index points to the same bin, the bin is preferably updated with the maximum of all the update values.

In command histbset_4ub_4ub four separate unsigned bytes, specify four indices to LUT 101 organized as 256 bytes to be set by four corresponding "update" values indicated by four separate unsigned bytes.

Pseudo-code for command histbset_4ub_4ub is:
LUT(AUCsrc0[07:00])=AUCsrc2[07:00]
LUT(AUCsrc0[15:08])=AUCsrc2[15:08]
LUT(AUCsrc0[23:16])=AUCsrc2[23:16]
LUT(AUCsrc0[31:24])=AUCsrc2[31:24]

In the case that more than one index points to the same bin, the bin is preferably set with the maximum update value given.

Sliding Window Commands

Sliding window commands provide for various manipulations of LUT 101. Each sliding window command provides for multiple, e.g. eight, locations to be updated simultaneously. Sliding window commands are performed in conjunction with "window size" control register 108 and internal register array "position register" 109. Window size register 108 stores a maximum value of any LUT 101 index stored in position register 109. When the window size register 108 is updated, the value stored therein correspondingly limits the LUT 101 index. A position update command (lutposld) takes the index values stored in one or more 8×8 input registers 105 and performs the modulo operation on each by the window size value stored in window size control register 108, storing the results in position register 109. The modulo operation (%) is equivalent to zeroing the most significant bits greater than the bits required to represent the window size. For example, for a window size of 32, bits 4:0 are maintained and bits 7:5 are zeroed.

Exemplary sliding window commands, according to different embodiments of the present invention are described as follows:

Upon command lutreadinc_8sb_8b eight separate bytes are read from LUT 101 as specified in position register 109. The indices of position register 109 are then incremented by the eight separate signed bytes modulo the value stored in window size register 108. Pseudo-code for command lutreadinc_8sb_8b is:
AUCres0[07:00]=LUT(POS[07:00])
AUCres0[15:08]=LUT(POS[15:08])
AUCres0[23:16]=LUT(POS[23:16])
AUCres0[31:24]=LUT(POS[31:24])
AUCres0[39:32]=LUT(POS[39:32])
AUCres0[47:40]=LUT(POS[47:40])
AUCres0[55:48]=LUT(POS[55:48])
AUCres0[63:56]=LUT(POS[63:56])
POS[07:00]=(POS[07:00]+AUCsrc0[07:00]) % Crwinsize
POS[15:08]=(POS[15:08]+AUCsrc0[15:08]) % Crwinsize
POS[23:16]=(POS[23:16]+AUCsrc0[23:16]) % Crwinsize
POS[31:24]=(POS[31:24]+AUCsrc0[31:24]) % Crwinsize
POS[39:32]=(POS[39:32]+AUCsrc0[39:32]) % Crwinsize
POS[47:40]=(POS[47:40]+AUCsrc0[47:40]) % Ciwinsize
POS[55:48]=(POS[55:48]+AUCsrc0[55:48]) % Crwinsize
POS[63:56]=(POS[63:56]+AUCsrc0[63:56]) % Crwinsize Upon command lutreadposld_8ub_8b eight separate bytes are read from LUT 101 as specified in position register 109 which contains eight unique indices.

The eight indices of position register 109 are then set by the eight separate unsigned bytes modulo the value stored in window size register 108.

Pseudo-code for command lutreadposld_8ub_8b is:
AUCres0[07:00]=LUT(POS[07:00])
AUCres0[15:08]=LUT(POS[15:08])
AUCres0[23:16]=LUT(POS[23:16])
AUCres0[31:24]=LUT(POS[31:24])
AUCres0[39:32]=LUT(POS[39:32])
AUCres0[47:40]=LUT(POS[47:40])
AUCres0[55:48]=LUT(POS[55:48])
AUCres0[63:56]=LUT(POS[63:56])
POS[07:00]=(AUCsrc0[07:00]) % Crwinsize
POS[15:08]=(AUCsrc0[15:08]) % Crwinsize
POS[23:16]=(AUCsrc0[23:16]) % Crwinsize
POS[31:24]=(AUCsrc0[31:24]) % Crwinsize
POS[39:32]=(AUCsrc0[39:32]) % Crwinsize
POS[47:40]=(AUCsrc0[47:40]) % Crwinsize
POS[55:48]=(AUCsrc0[55:48]) % Crwinsize
POS[63:56]=(AUCsrc0[63:56]) % Crwinsize Upon command lutrwinc_8ub_1ub_8b_8b eight separate bytes are read from LUT 101 as specified in position register 109 which contains eight unique indices. The eight indices of position register 109 are then incremented by the eight separate signed bytes modulo the value stored in window register 108. Eight separate bytes are written to LUT 101 as specified in one unsigned byte which is an initial index to be incremented to store the 8 bytes sequentially in LUT 101. The initial index must be 8 byte-aligned, and thus the hardware zeros the 3 least significant bits. The write operation is optionally performed in conjunction with write delay control register 111 which contains a value to be decremented upon receiving a write type command. The actual write indicated in the command will only be executed when the delay register value is zero (no decrement on register 111 will be performed following a successful write of the data). Pseudo-code for command lutrwinc_8ub_1ub_8b_8b is:

AUCres0[07:00]=LUT(POS[07:00])
    AUCres0[15:08]=LUT(POS[15:08])
    AUCres0[23:16]=LUT(POS[23:16])
    AUCres0[31:24]=LUT(POS[31:24])
    AUCres0[39:32]=LUT(POS[39:32])
    AUCres0[47:40]=LUT(POS[47:40])
    AUCres0[55:48]=LUT(POS[55:48])
    AUCres0[63:56]=LUT(POS[63:56])
    POS[07:00]=(POS[07:00]+AUCsrc0[07:00]) % Crwinsize
    POS[15:08]=(POS[15:08]+AUCsrc0[15:08]) % Crwinsize
    POS[23:16]=(POS[23:16]+AUCsrc0[23:16]) % Crwinsize
    POS[31:24]=(POS[31:24]+AUCsrc0[31:24]) % Crwinsize
    POS[39:32]=(POS[39:32]+AUCsrc0[39:32]) % Crwinsize
    POS[47:40]=(POS[47:40]+AUCsrc0[47:40]) % Crwinsize
    POS[55:48]=(POS[55:48]+AUCsrc0[55:48]) % Crwinsize
    POS[63:56]=(POS[63:56]+AUCsrc0[63:56]) % Crwinsize
    LUT(AUCsrc1[07:03],000)=AUCsrc2[07:00]
    LUT(AUCsrc1[07:03],001)=AUCsrc2[15:08]
    LUT(AUCsrc1[07:03],010)=AUCsrc2[23:16]
    LUT(AUCsrc1[07:03],011)=AUCsrc2[31:24]
    LUT(AUCsrc1[07:03],100)=AUCsrc2[39:32]
    LUT(AUCsrc1[07:03],101)=AUCsrc2[47:40]
    LUT(AUCsrc1[07:03],110)=AUCsrc2[55:48]
    LUT(AUCsrc1[07:03],111)=AUCsrc2[63:56]

Upon command lutrwposld_8sb_1ub_8b_8b eight separate bytes, are read from LUT 101 as specified in position register 109 which contains eight unique indices. The eight indices of position register 109 are then set by the eight separate unsigned bytes modulo the value stored in window register 108. Eight separate bytes are written to the LUT as specified in the one unsigned byte which is an initial index to be incremented to store the 8 bytes sequentially in LUT 101. The index is eight byte aligned, and thus processing circuitry 102 zeros the three least significant bits. The write operation is performed in conjunction with write delay control register 111 which contains a value to be decremented upon receiving any write type command. The actual write indicated in the command will only be executed when the delay register value is zero (no decrement on write delay control register 111 is performed following a successful write of the data.

Pseudo code for command lutrwposld_8sb_1ub_8b_8b is:
    AUCres0[07:00]=LUT(POS[07:00])
    AUCres0[15:08]=LUT(POS[15:08])
    AUCres0[23:16]=LUT(POS[23:16])
    AUCres0[31:24]=LUT(POS[31:24])
    AUCres0[39:32]=LUT(POS[39:32])
    AUCres0[47:40]=LUT(POS[47:40])
    AUCres0[55:48]=LUT(POS[55:48])
    AUCres0[63:56]=LUT(POS[63:56])
    POS[07:00]=(AUCsrc0[07:00]) % Crwinsize
    POS[15:08]=(AUCsrc0[15:08]) % Crwinsize
    POS[23:16]=(AUCsrc0[23:16]) % crwinsize
    POS[31:24]=(AUCsrc0[31:24]) % Crwinsize
    POS[39:32]=(AUCsrc0[39:32]) % crwinsize
    POS[47:40]=(AUCsrc0[47:40]) % crwinsize
    POS[55:48]=(AUCsrc0[55:48]) % Crwinsize
    POS[63:56]=(AUCsrc0[63:56]) % Crwinsize
    LUT(AUCsrc1[07:03],000)=AUCsrc2[07:00]
    LUT(AUCsrc1[07:03],001)=AUCsrc2[15:08]
    LUT(AUCsrc1[07:03],010)=AUCsrc2[23:16]
    LUT(AUCsrc1[07:03],011)=AUCsrc2[31:24]
    LUT(AUCsrc1[07:03],100)=AUCsrc2[39:32]
    LUT(AUCsrc1[07:03],101)=AUCsrc2[47:40]
    LUT(AUCsrc1[07:03],110)=AUCsrc2[55:48]
    LUT(AUCsrc1[07:03],111)=AUCsrc2[63:56]

Upon command lutposld eight bytes of index data are loaded into 64 bit position register 109 (1 byte per position) whereby the values are the result of the input data bytes modulo the value stored in widow size control register 108. Processing circuitry 102 updates position register 109 as specified by the specific command. Pseudo code for command lutposld is:
    POS[07:00]=(AUCsrc0[07:00]) % Crwinsize
    POS[15:08]=(AUCsrc0[15:08]) % Crwinsize
    POS[23:16]=(AUCsrc0[23:16]) % Crwinsize
    POS[31:24]=(Aucsrc0[31:24]) % crwinsize
    POS[39:32]=(AUCsrc0[39:32]) % Crwinsize
    POS[47:40]=(AUCsrc0[47:40]) % crwinsize
    POS[55:48]=(AUCsrc0[55:48]) % crwinsize
    POS[63:56]=(AUCsrc0[63:56]) % Crwinsize

Miscellaneous Commands

The Reset command zeros output register 119 so that output appears zero until the next command which changes outputs is executed.

The Nop command is used as required in order to maintain values of the output register 119 valid until the next command which changes values of output register 119.

Histogram—Data Forwarder

Figure 2A:
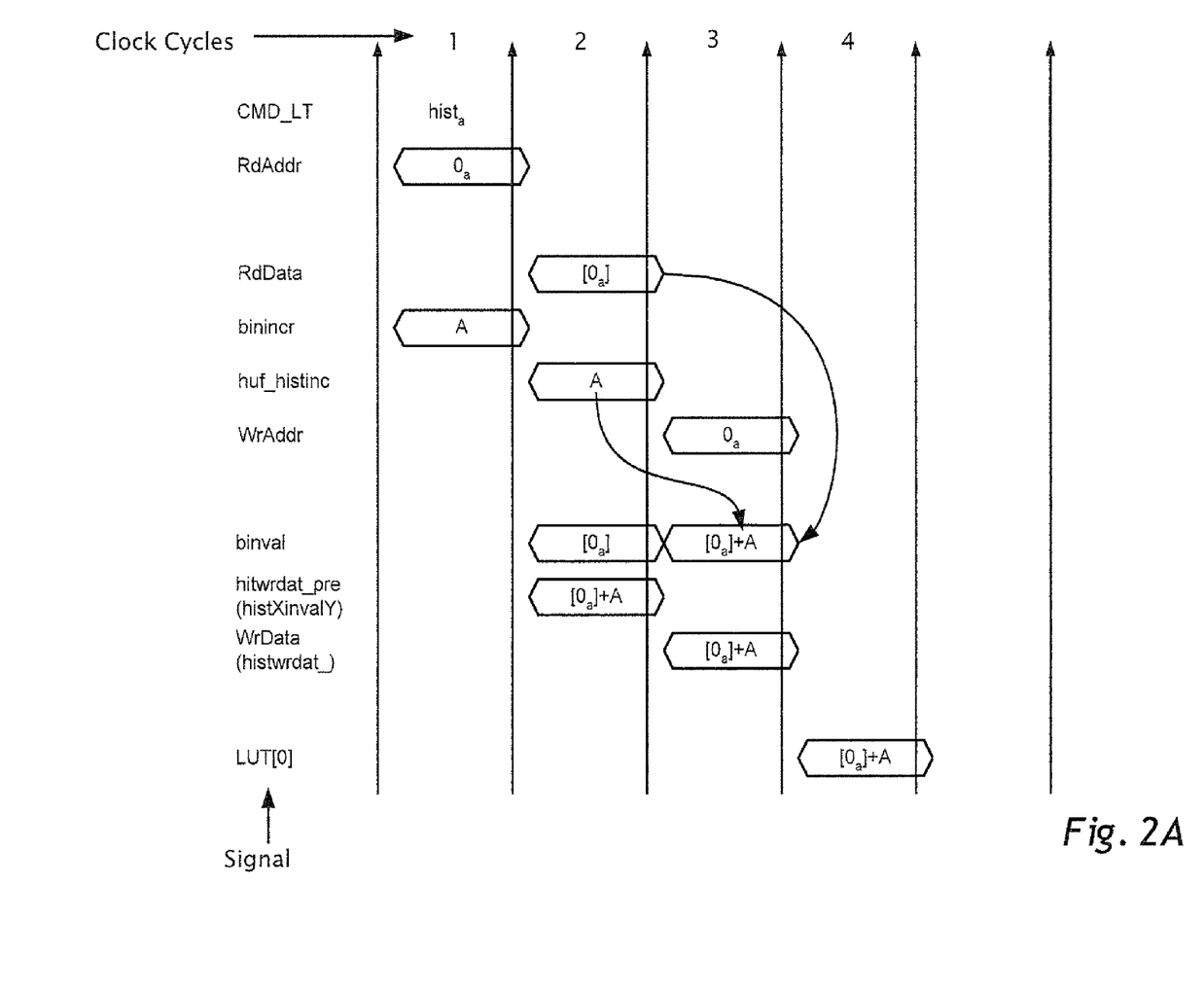
FIG. 2A-C illustrates a simplified timing diagrams of histogram and other commands initiated on consecutive clock pulses, according to embodiments of the present invention.

Reference is now made to FIG. 2A which illustrates a simplified timing diagram of a histogram command for LUT 101, according to an embodiment of the present invention. Histogram circuitry typically requires a minimum of three clock cycles to complete one histogram increment command, e.g. histb_4ub_4ub. A histogram command, e.g. histb_4ub_4ub, is used to access address location 0 in order to increment the value stored in address location 0 by a value A. At clock cycle 1, address 0 and increment value A are input. At clock cycle 2, the value [0] stored in address 0 is available on rdData bus and added to the increment value (huf_histinc). At clock cycle 3, the new bin value (binval) calculated by adding the respective values in huf_histinc and rdData is now ready on WrDat bus to be written to LUT 101.

Figure 2B:
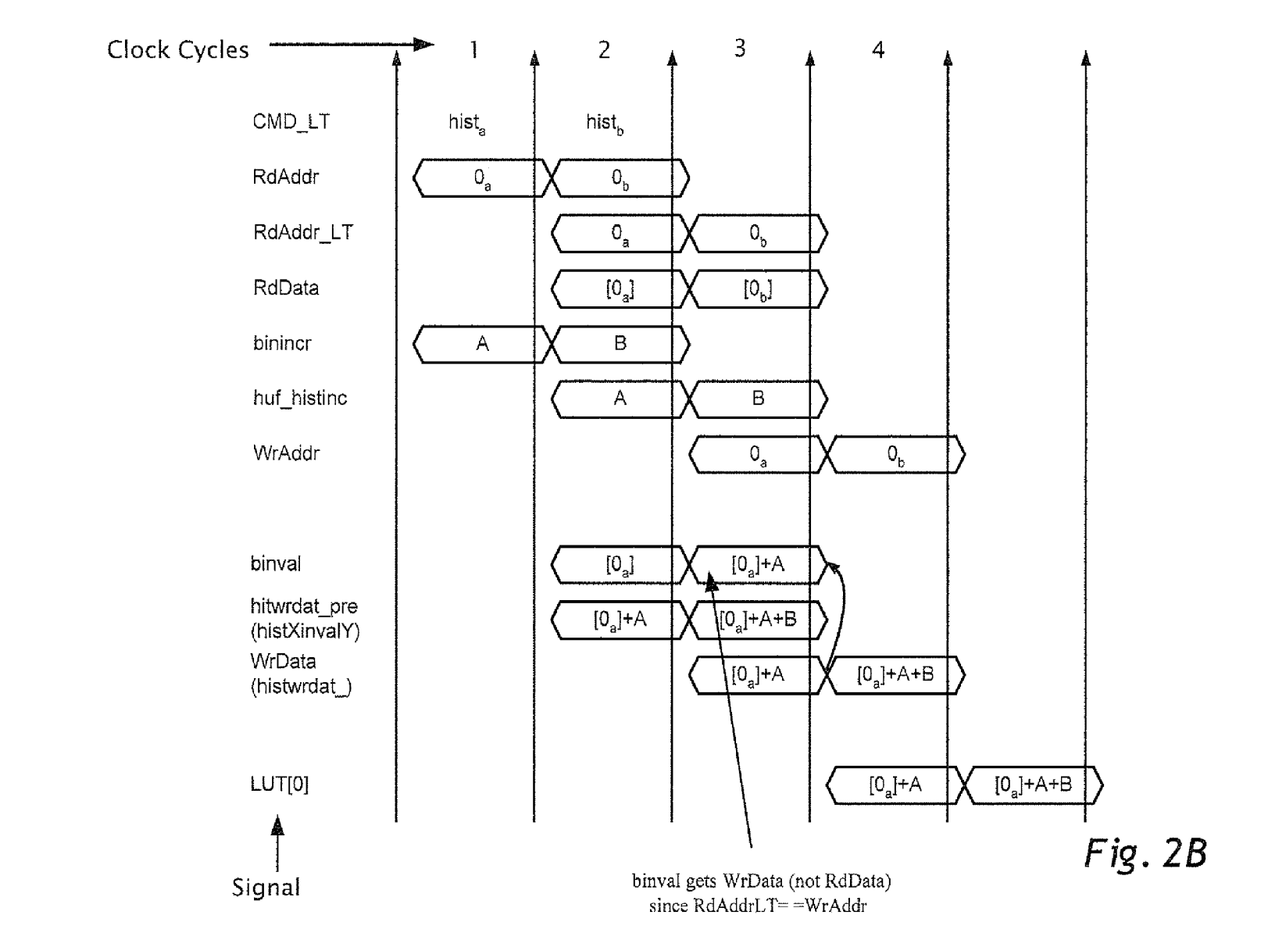

The data forwarding mechanism recognizes that a new command requires data from the previous command not yet available in the memory element or register, and consequently performs a "read" operation not from the memory cell which is not yet ready for reading but from another bus within the internal data pipe which has the valid datum. Reference is now made to FIG. 2B which includes a simplified block diagram of two consecutive histogram commands hist$_a$ as in the timing diagram of FIG. 2A and in addition a second histogram command hist$_b$ which is input into ELUT 10 on the next clock cycle, clock cycle 2. It is readily seen that the contents of location 0 now on the RdData bus in cycle 3 is not valid for use as it does not include the increment value A from command hist$_a$. Instead, according to an embodiment of the present invention, processing circuitry 102 realizes this condition and "forwards" the data calculated in the first hist command (wherein WrDat has [0$_a$]+A) and that is used as the "contents read" (i.e., binval) by the second hist command hist$_b$.

Figure 2C:
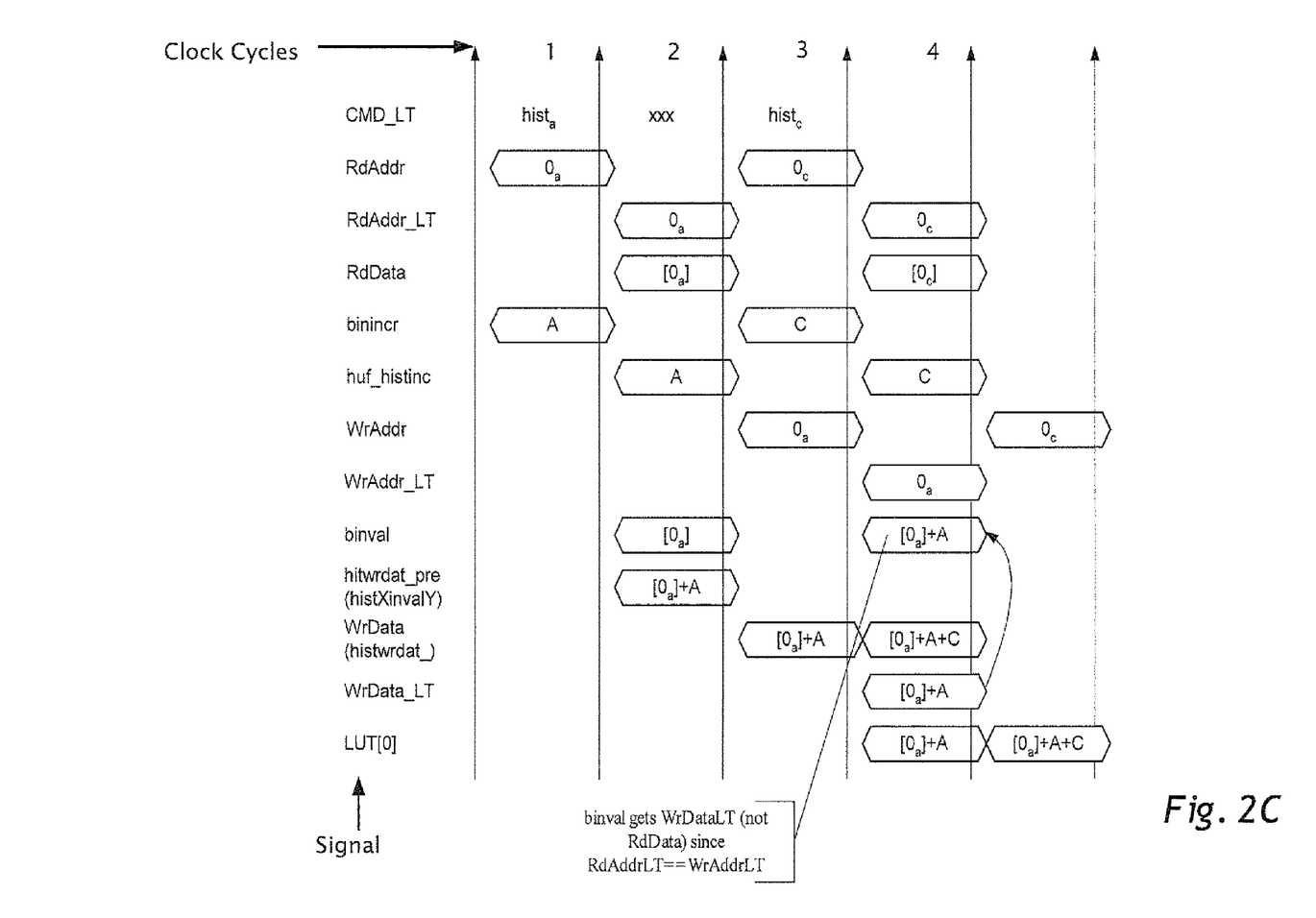

Reference is now made to FIG. 2C, which illustrates a first histogram command hist$_a$ as in FIG. 2A, followed by another command xxx during the second clock cycle followed by a third histogram command on the third clock cycle, hist$_c$.

As shown, the second histogram command (hist$_c$) must not use the contents of location 0 (marked 0$_c$) now on the RdData bus since this does not account for the previous hist command (hist$_a$) which is still in progress. Instead, processing circuitry 102 recognizes this condition and "forwards" the data calculated in the first hist command (WrDat_LT has [0$_a$]+A) and that is used as the "contents read" (i.e., binval) by the second hist command (hist$_c$). It should be noted that the timing the command sequence hist$_a$-xxx-hist$_c$ as illustrated in FIG. 2C is a different case then two consecutive hist commands hist$_a$-hist$_b$ because in the timing of FIG. 2C the data from the first hist command is one state further in the internal data pipeline (i.e., the hist$_a$-hist$_b$ scenario used WrDat for data forwarding whereas the hist$_a$-xxx-hist$_c$ scenario used WrDat_LT).

Histogram Update Logic

Figure 3:
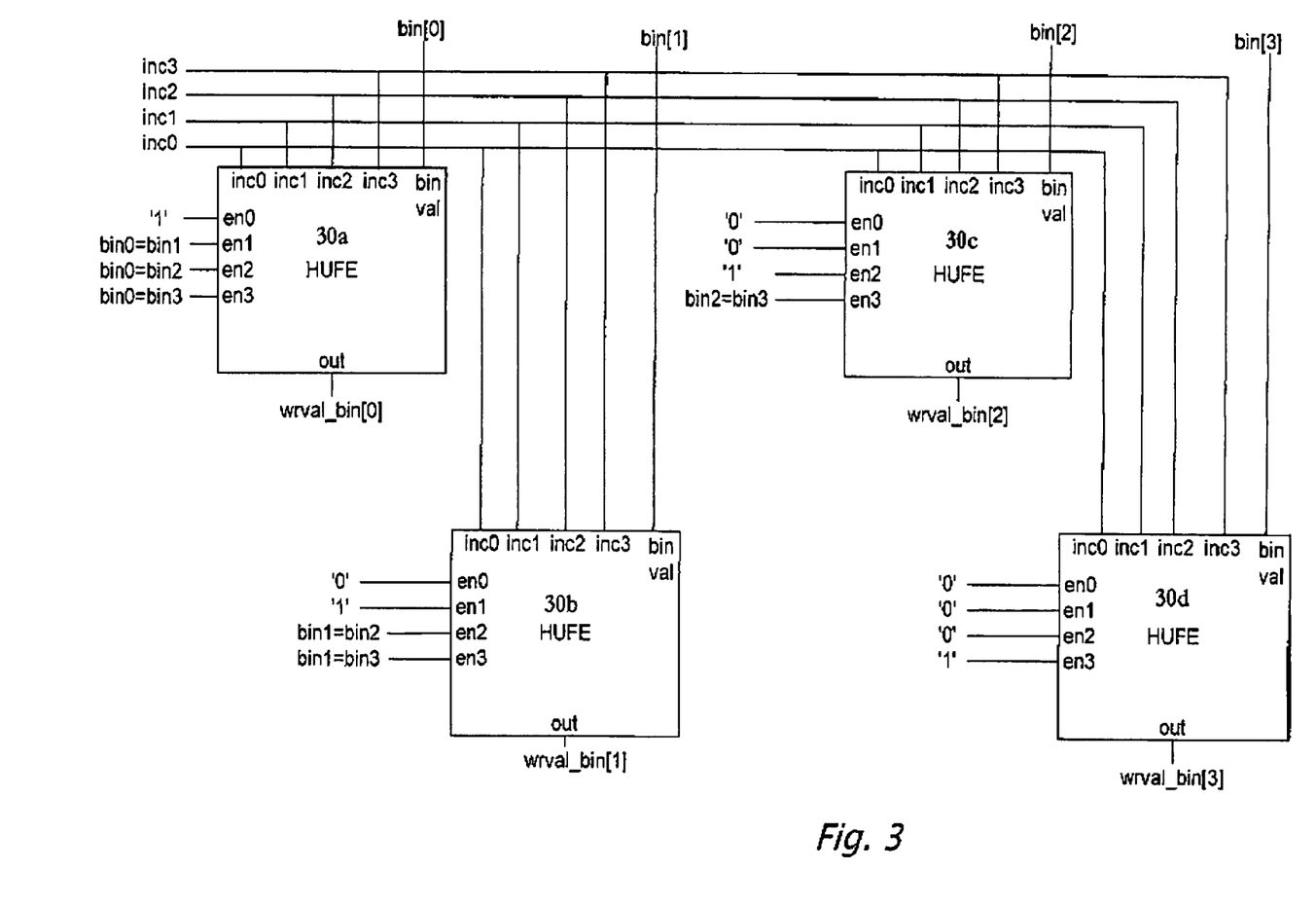
FIG. 3 and FIG. 4 illustrate a simplified block diagram of a processing circuit, according to an embodiment of the present invention.

Reference is now made to FIG. 3, illustrating a simplified block diagram of a circuit of device 10, according to an embodiment of the present invention. In order to support the multiple histogram commands as described above, e.g. bin increment, minimum, maximum, and set, and further account for the possibility that a single instance of a histogram command may contain multiple references to a single bin, multiple generalized logic units 30a, 30b, 30c, and 30d or Histogram Update Function Elements (HUFE 30a-30d) such that each handles a single bin referenced by the single instance of a histogram command, e.g. four elements 30 for four bins as shown in FIG. 3.

Each HUFE 30 has four inputs inc0, inc1, inc2 and inc3 which correspond to the four incremental values input in the histogram command for incrementing the four bin values, respectively. Each HUFE 30 has as an input a bin value input corresponding to the bin it is processing. HUFE 30 also four logical inputs en0, en1, en2 and en3 which indicate the address operands which are the same, if any are the same. Logical inputs en0, en1, en2 and en3 are preferably generated and output by logic circuitry 103. For HUFE 30a, en0 is always enabled with a value '1', en1 is enabled only when the bin0 and bin1 are the same address locations; en2 is enabled only when bin0 and bin2 are the same address locations; en3 is enabled only when bin0 and bin3 are the same address locations. For HUFE 30b, en0 is always disabled with a value '0', en1 is always enabled; en2 is enabled only when bin1 and bin2 are the same address locations; en3 is enabled only when bin1 and bin3 are the same address locations. For HUFE 30c, en0 and en1 are always disabled with a value '0', en2 is always enabled; en3 is enabled only when bin2 and bin3 are the same address locations and for HUFE 30d, en0, en1, and en2 are always disabled with a value '0', and en3 is always enabled. Each HUFE 30 includes a respective output wrval_bin[0], wrval_bin[1], wrval_bin[2], wrval_bin[3] of an updated bin value. In the case where an out value is unneeded since the bin address was handled by a previous HUFE (e.g., bin0=bin3) so the bin output is unnecessary and the value is simply ignored by processing circuitry 102 responsible for writing the bin value to LUT 101.

Following the execution of the command the final value is "saturated" if necessary. That is, if the total sum of the inputs exceeded the 8b or 16b output width, then the output value is maxed to either xFF or xFFFF, respectively.

Figure 4:
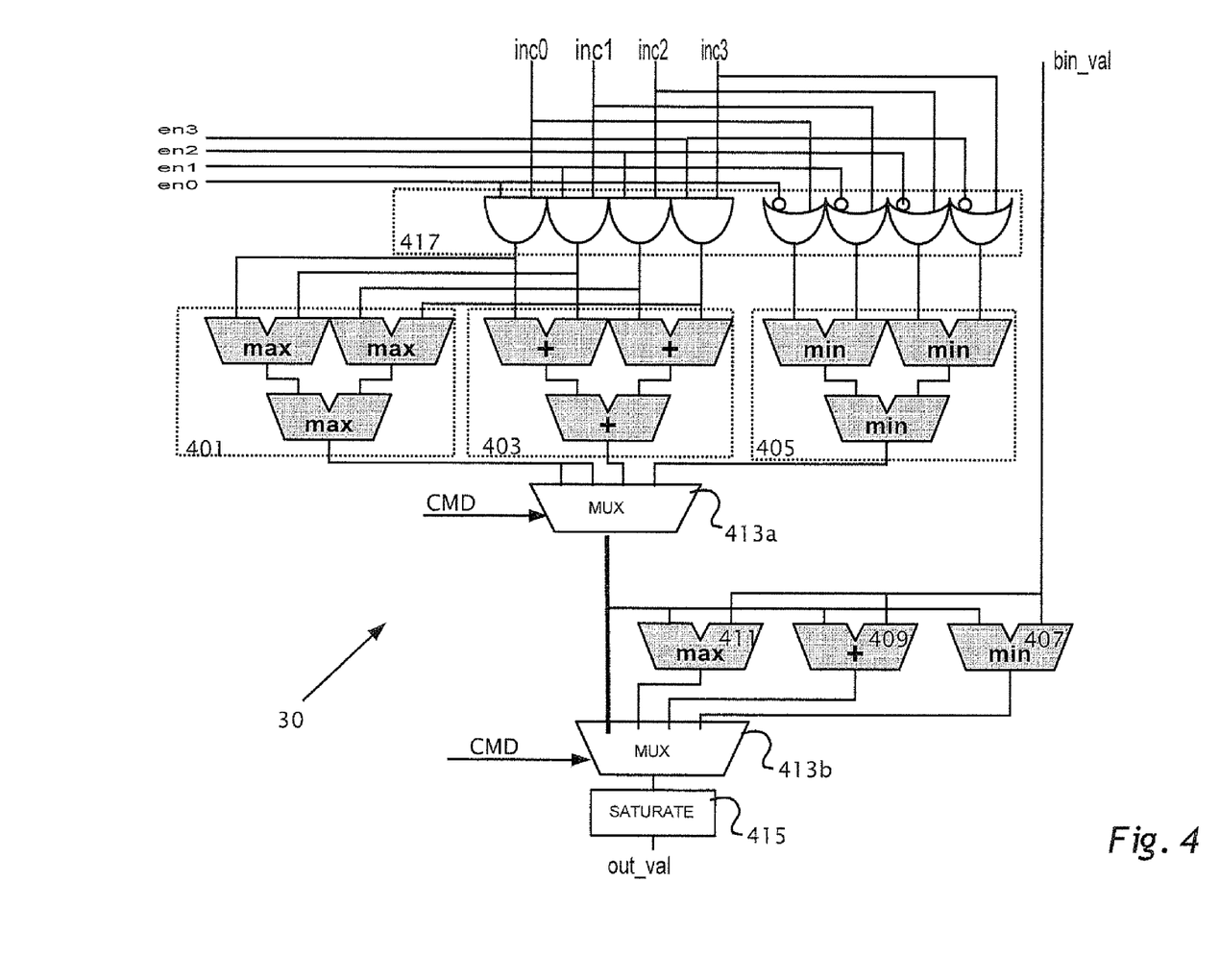

Reference is now made to FIG. 4, which is an exemplary block diagram of HUFE 30. HUFF 30 functions to perform histogram commands for any of four histogram commands, initializing a bin value, incrementing a bin value by an input value, finding a minimum between the current bin value and an input value or finding a maximum between the current bin value and an input value.

When none of the inputs bin addresses are the same, then each HUFE 30 instance operates independently on the input inc value. Thus for example HUFE 30d, will have only en3 enabled and the input value inc3 will then be handled as the lone input operand according to the input command. Thus, if the command is "max" the inc3 input will be fed uninhibited through logic 417, 401, 403, 405, 413a and arriving at block 411 which calculates the maximum between its inputs inc3 and bin_val. If the command was "inc" then block 409 adds inputs inc3 and bin_val, and if the command was "min" then block 407 calculates the minimum between its inputs inc3 and bin_val. For the "set" command inc3 just passes through to multiplexer 413b. Depending on the command (e.g. set, increment, maximum or minimum) being used a control signal to multiplexer 413b selects the appropriate output to outval.

Otherwise, when two or more address operands are the same, logic circuitry 103 generates enable signals en0, en1, en2 and en3 accordingly. Block 417 includes logic gates which route the input signals respectively to block 401 for performing a preliminary maximum calculation between any of inputs inc0, inc1, inc2 and inc3 for which the respective address operands are the same, similarly to block 405 for performing a preliminary minimum calculation, between any of inputs inc0, inc1, inc2 and inc3 for which the respective address operands are the same and to block 403 for addition of any of inputs inc0, inc1, inc2 and inc3 for which the respective address operands are the same. In the event that the total sum of the inputs exceeded the 8 bit or 16 bit output width, block 415 functions to saturate the output value to its maximum (xFF or xFFFF, respectively).

While the invention has been described with respect to a limited number of embodiments, it will be appreciated that many variations, modifications and other applications of the invention may be made.

What is claimed is:

1. An electronic device implemented on a semiconductor chip, the electronic device, comprising:
    (a) an array of addressable registers storing a plurality of data;
    (b) a plurality of input registers operatively connected to said array of addressable registers, wherein said input registers are configured to store an input command parameter and a plurality of operands; wherein said operands include a plurality of address operands referencing at least one register of said array of addressable registers;
    (c) processing circuitry configured to process, based on said input command parameter, said data; wherein a single instance of a command accesses said at least one register of said array of addressable registers, and based on said input command parameter said processing circuitry for all of said address operands: reads a datum of said data previously stored in said at least one register, updates said datum thereby producing an updated datum, and writes said updated datum into said at least one register;
(d) logic circuitry operatively attached between said input registers and said processing circuitry, said logic circuitry configured to provide a logical output signal to said processing circuitry indicating which if any of said address operands are identical thereby supporting at least two of said address operands being identical.

2. The electronic device, according to claim 1, wherein said processing circuitry based on said logical output signal, is configured to process any said identical address operands prior to writing said updated datum into said at least one register.

3. The electronic device, according to claim 1, further comprising:
(e) a clock adapted to provide a plurality of clock pulses, wherein said processing circuitry processes said command during at least three clock pulses, wherein a new instance of said command begins processing by said processing circuitry on a consecutive clock pulse so that there is a command throughput of at least one command per clock pulse.

4. The electronic device, according to claim 1, wherein said command sets a bin of a histogram by an incremental value.

5. The electronic device, according to claim 1, wherein said command increments a bin of a histogram by an incremental value.

6. The electronic device, according to claim 1, wherein said command compares said datum with at least one incremental value, said command calculates the minimal value selected from the group of said datum and said at least one incremental value and said command writes said minimal value as said updated datum.

7. The electronic device, according to claim 1, wherein said command compares said datum with at least one incremental value, wherein said command calculates the maximal value selected from the group of said datum and said at least one incremental value and writes said maximal value as updated datum.

8. The electronic device, according to claim 1, further comprising:
(e) a second array of registers operatively connected to said array of addressable registers; wherein said registers of said second array store a plurality of locations referencing a portion of said array of addressable registers.

9. The electronic device, according to claim 8, wherein said portion is contiguous, the electronic device further comprising:
(f) an input control register operatively connected to said logic circuitry; wherein the size of said contiguous portion is specified by a size value stored in said input control register.

10. The electronic device, according to claim 9, wherein said command accesses a location solely within said contiguous portion of said array of addressable registers.

11. The electronic device, according to claim 8, further comprising
(f) an input control register operatively connected to said logic circuitry, wherein a door-knock value is stored in said input control register, wherein upon initiating said command, said door-knock value is decremented and only upon said door-knock value equaling a previously defined minimum value is said updated datum written into said at least one register.

12. An electronic device implemented on a semiconductor chip, the electronic device, comprising:
(a) a first array of addressable registers;
(b) a plurality of input registers operatively connected to said first array; wherein said input registers are adapted to store an input command parameter, a plurality of operands, and a size value; and
(c) a second array of registers operatively connected to said first array; wherein said operands reference said second array of registers; wherein said registers of said second array are adapted to store a plurality of address operands referencing a plurality of locations of said first array and wherein the accessible area of said addressable registers is specified by said size value.

13. The electronic device, according to claim 12, wherein said address operands as stored respectively in said second array are calculated based on said input command parameter modulo said size value.

14. The electronic device, according to claim 12, further comprising:
(d) processing circuitry which upon processing a single instance of a command, based on said input command parameter, processes a plurality of data stored in said locations.

15. The electronic device, according to claim 14, wherein a single instance of said command accesses at least one of said addressable registers of said first array of said accessible area, and based on said input command parameter, said command for said at least one addressable register and for all said address operands: reads a datum of said data previously stored in said at least one addressable register of said first array of addressable registers, updates said datum thereby producing an updated datum, and writes said updated datum into said at least one addressable register of said first array of addressable registers.

16. The electronic device, according to claim 15, wherein the single instance of the command referencing the at least one addressable register of the array of addressable registers supports at least two of said address operands being identical.

17. The electronic device, according to claim 15, further comprising:
(e) a clock adapted to provide a plurality of clock pulses, wherein said processing circuitry is adapted to process said command during at least three clock pulses, wherein a new instance of said command begins processing by said processing circuitry on consecutive clock pulses so that there is a command throughput of one command per clock pulse.

18. An electronic device implemented on a semiconductor chip, the electronic device comprising:
(a) an array of addressable registers;
(b) a plurality of input registers operatively connected to said array of addressable registers, said input registers adapted to store an input command parameter and a plurality of operands; wherein said operands include a plurality of address operands referencing at least one addressable register of said array of addressable registers; wherein said input command parameter specifies a command; wherein a single instance of said command accesses the at least one addressable register of the array;
(c) processing circuitry which executes the command thereby accessing for all said address operands at least one of said addressable registers of said array, and based on said input command parameter writes a datum into said at least one register; and (d) a clock operatively attached to said processing circuitry provides a plurality of clock pulses, wherein the command throughput in number of commands processed per clock pulse is independent of the number of said address operands.

19. The electronic device, according to claim 18, wherein said command throughput is one command per clock pulse.

20. The electronic device, according to claim 18, further comprising the step of (e) an input control register operatively connected to said processing circuitry, wherein a door-knock value is stored in said input control register, and upon receiving said command, said door-knock value is decremented and only upon said door-knock value equaling a previously defined minimum value is said datum written into said at least one addressable register of said array of addressable registers.

\* \* \* \* \*